Figure 1:
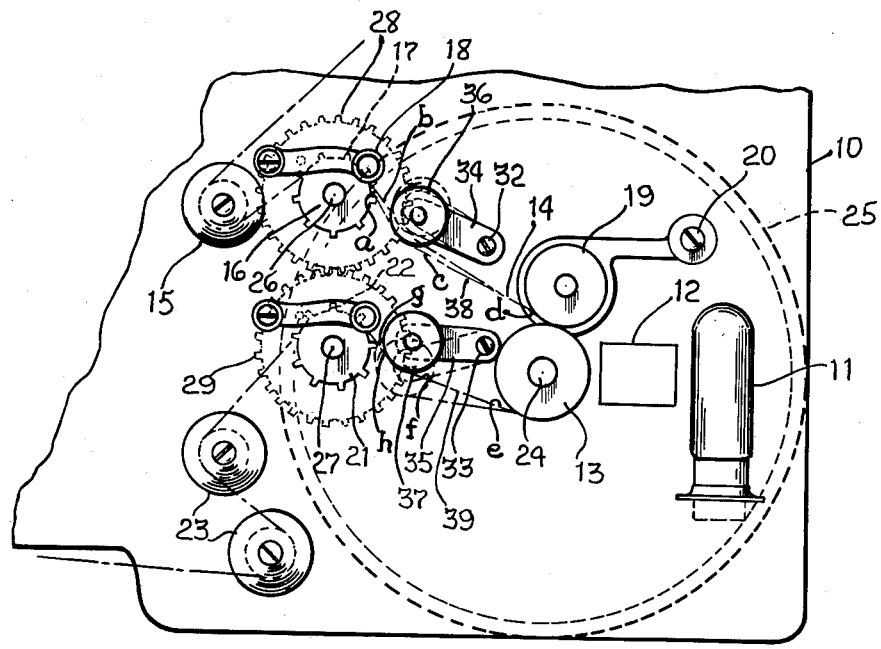

Oct. 25, 1955     E. P. KENNEDY     2,721,738
MEANS FOR STABILIZING FILM IN A SOUND TRANSLATING APPARATUS
Original Filed Oct. 28, 1947

INVENTOR.
Edward P. Kennedy
BY Clarence E. Threedy
His Attorney.

United States Patent Office 2,721,738
Patented Oct. 25, 1955

2,721,738

MEANS FOR STABILIZING FILM IN A SOUND TRANSLATING APPARATUS

Edward P. Kennedy, West End, N. J., assignor, by mesne assignments, to the United States of America as represented by the Secretary of the Army Continuation of abandoned application Serial No. 782,665, October 28, 1947. This application July 6, 1950, Serial No. 172,377

2 Claims. (Cl. 271—2.3)

(Granted under Title 35, U. S. Code (1952), sec. 266)

The invention described herein may be manufactured and used by or for the Government for governmental purposes, without the payment of any royalty thereon.

This application is a continuation of abandoned application Serial Number 782,665, filed October 28, 1947.

This invention relates to a new and useful means for stabilizing film in a sound translating apparatus, particularly of the sound reproducing motion picture film type and has for its principal object the provision of a stabilizer which is positive in its operation of stabilizing the moving film, thereby to reduce to a minimum film disturbances which otherwise occur through ineffective stabilization of the film.

Another object of the invention is to provide an arrangement of the class hereinafter described which is relatively light in weight and one which dispenses with the employment of a heavy inertia fly wheel. The arrangement for effectively and positively, with the maximum sensitivity, stabilizing the moving film as it is passed onto and shed from the sound drum, may be said to be composed of three distinct component parts which function at times as indiivdual units, and in pairs, and all together, to bring about stability and uniform film velocity past the sound drum.

A further object of the invention is the provision of this method and means for dissipating and/or reducing to a minimum many of the common disturbances which are present in motion picture projecting and sound reproducing apparatuses, some of the common disturbances being gear-train teeth impulses, sprocket teeth impulses, film slippage about the sprocket teeth, sprocket cam action due to eccentricity, artificial run-outs caused by lumps of foreign matter collected on film surfaces, film splices, take-up reel disturbances, or any combination or accumulation of all these disturbances.

Yet a further and equally important object of this invention is the provision of an arrangement of parts hereinafter described which is highly sensitive in its function of stabilizing the film upon the presence of any irregularity in the action or movement of the film which would otherwise function to bring about instability of the film.

A further object of the invention is to reduce to a minimum the number of precision parts, and at the same time to improve the output over much more costly arrangements.

Other objects will appear more fully hereinafter.

The invention consists in the novel combination and arrangement of parts to be hereinafter described and claimed.

Figure 2:
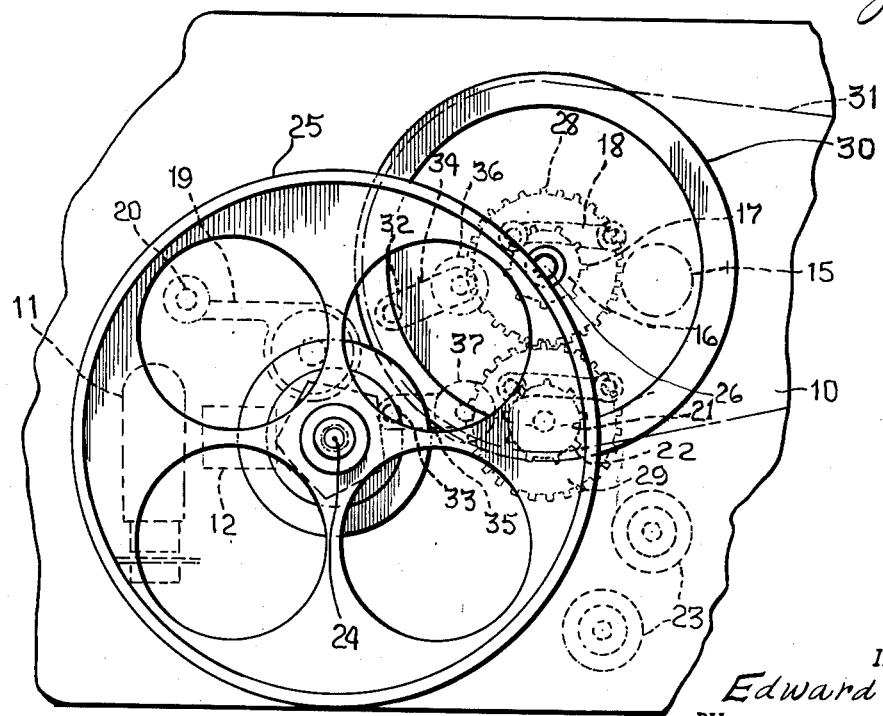

The invention will be best understood by reference to the accompanying drawings showing the application of my invention, and in which:

Fig. 1 is a fragmentary sectional detail view of a motion picture projecting and sound reproducing apparatus showing my invention incorporated therein; and Fig. 2 is a fragmentary detail view of the reverse side of that shown in Fig. 1.

Referring now more particularly to the drawings, 10 indicates a body plate of a motion picture projecting and sound reproducing apparatus of a standard and conventional construction which includes the exciter lamp 11, a scanning lens 12, and a sound drum 13, all of which parts are related one to another in a manner well known in the art. Together with a photocell this constitutes a sound translating device responsive to the sound track. The drum 13 is adapted to carry the film 14 on which is present the usual sound track. This film, as shown in the drawings, passes around an idle roller 15 arranged adjacent a feed sprocket 16 having the usual sprocket teeth 17 which engage the perforations of the film and having associated therewith the usual and conventional pad roller 18.

From the feed sprocket 16 the film passes around the sound drum 13 and is rolled into close facial contact therewith by impedance roller 19 pivotally supported as at 20 to the body plate 10 of the apparatus. From this sound drum 13 the film is fed over a take-off sprocket 21 similar to the sprocket 16 and likewise provided with sprocket teeth 22, adapted for engagement with the film perforations. From sprocket 21 the film passes over and around idle rollers 23 and thence to the film take-up reel (not shown).

Associated with the shaft 24 carrying the sound drum 13 is an inertia wheel 25 which by reason of the employment of my improved method and means of stabilizing the film in its passage around the sound drum, may be constructed relatively light in weight.

The shafts 26 and 27 carrying the sprockets 16 and 21, respectively, are connected together by intermeshing gears 28 and 29. On the shaft 26 is a drive pulley 30 driven by means of a suitable belt 31 in a manner well known in the art. In lieu of this belt 31 there may be employed a train of gears for the purpose stated.

The body plate 10 has connected thereto in any suitable manner pintle shafts 32 and 33 in parallel spaced relation with respect to each other and other axes of the film carrying elements. Pivotally carried by each of these shafts 32 and 33 are arms 34 and 35 which are shown of the same form, and may be of approximately the same weight. The outer extremities of these arms 34 and 35 rotatably support rollers 36 and 37, which, under conditions to be hereinafter explained, will effect stabilization of the film upon the presence of one or more of the common disturbances hereinbefore set forth. The arms 34 and 35 extend generally along the path of those portions of the film against which the rollers 36 and 37 will rest in operation, so that the rollers will move approximately at right angles to the film path as the film tension varies due to any cause.

It will be noted that the feed sprocket 16 is arranged with respect to the film 14 and the sprocket 21 so that with the film on the teeth of one sprocket and stretched taut around the sound drum 13 to the other sprocket it will not register with the teeth but must be loosened approximately one-half frame. This arrangement assists in proper threading and, of itself, governs the minimum length of the film path from the sprockets to and around the sound drum, whereby if the film is pulled tight at either sprocket position, the sprocket teeth will not engage the film perforations until the film is slacked off one-half frame or approximately .150 inch. This slack is desirable and necessary for the reason that it provides a sufficient length of slack film which will form into the natural film loops or bowed bights a, b, c, d, e, f, g, and h, when the film is partially tightened by the weight of the rollers 36, 37, all of which bights are necessary to the system's proper functioning. This slack is also desirable for the reason that it provides sufficient latitude in the interposed film length to allow for all usual degrees of film shrinkage, a factor that has to be accommodated for by film propelling systems. The natural position of these film loops is such that the force of each roller is balanced by the pull of its portion of the film and the pull of each portion is also balanced around the sound drum. If the film elasticity is ignored, the situation is analogous to a loaded clothesline with a pole at the center, except that the sound drum has substantial inertia; each portion of line or film will have sufficient sag to support its load at the pull required for the combination.

The film material has certain properties very significant to the operation, particularly the combination of properties known as "viscoelasticity" which tends to make the film substantially straight, and yet return slowly toward such a straight form when bent, as discussed in Fundamentals of Plastics by Richardson and Wilson, McGraw Hill 1946, p. 408. The latter or viscous aspect is utilized for damping out oscillations which might otherwise occur from the weights and the actual elasticity of the film bowed bights, used to absorb high-frequency disturbances, or the somewhat elastic property of changes in force vectors as the film path changes, used to absorb low-frequency disturbances in starting or running. When the viscosity is opposed to the elasticity the effect known as "elastic memory" can be observed in the slow creep of the material back to its stable form. The viscosity may be modified by temperature and under certain extreme conditions even the elasticity may be altered to provide a new stable form.

When the apparatus starts in motion the lower web 39 of the film is drawn relatively tight by the rotation of the sprocket 21 while the sprocket 16 is feeding out the film at the same rate as the sprocket 21 is taking up the film. The sound drum is therefore energized by the pull thus created because the impedance roller 19 is enforcing compliance between the film and the drum, and in time this will bring the drum and inertia wheel up to the film velocity being imposed upon it. During this operation the roller 37 has been forced to assume a maximum upper position against the downward pull due to gravity. Meanwhile slack has accumulated in the upper web 38 of the film, which allows the roller 36 to be pulled by gravity into its maximum lower position. During the period that the inertia wheel 25 approaches a velocity which corresponds to that of the film, the film supplies constantly decreasing amounts of energy to it, until there arrives a time when it is called upon to supply only the minute supply of energy necessary to overcome the overall friction. During this period, the rollers 36 and 37 are constantly assuming new positions interposed by the constant downward pull of gravity on them accompanied by corresponding changes of force distribution in the loops 38 and 39. As the roller 37 takes a lower position, the roller 36 is constrained to take a directly opposite, higher position, and so on, both moving simultaneously in opposite directions until a condition has been arrived at when the resultant of all opposing forces on either side are reduced to equality. When this condition is satisfied, teetering ceases and the film travels in a stable condition unless and until disturbances upset the established balance in either or both of the webs 38 and 39. Such disturbances cause the film webs 38 and 39 and the rollers 36 and 37 to transfer their energy through the gravity-coupled rollers from one side to the other and vice versa, via the inertia wheel if the disturbance is of sufficient magnitude.

After the dissipation of such disturbance, the bights $a$ to $h$ inclusive automatically tend to assume their normal shape, and stability is again restored when a condition is reached where each repeated energy transfer from one side to the other has been reduced to the point of absorption and dissipation through the presence of the combined viscosity of the film loops 38 and 39 working together with the combined friction of the entire operative portion of the apparatus. Also inherent in the film is a certain amount of elasticity. The various forces due to elasticity and gravity, the masses of the elements, losses due to friction and viscosity, and vibrations due to sprocket teeth and their driving gears, could involve a very complex mathematical analysis; such analysis is unnecessary in view of the substantial value of the viscosity which dissipates the vibrational effects. Similarly the proper positions for axes 32 and 33 may be calculated but an empirical determination of the conditions giving best results and suited to the arrangement of the other parts is the most practical solution of the problem. In this manner it will be seen that most minor disturbances are absorbed by the rollers 36 and 37, or either of them, and the film webs, before such disturbances reach the sound drum. Stated another way, the balanced gravitational arrangement of the rollers which utilizes the mechanical friction and the viscosity characteristic of the film bights, is somewhat independent of the inertia wheel itself in dealing with all but major disturbances, such as film splices, dirt, lumps and the like upon the film.

It will be apparent that the physical characteristic behavior of the film, in either the upper or the lower web, is identical and therefore introduces no unlike components of its own.

As indicated before, the gravity-urged rollers 36 and 37 are of selected size, weight and position and travel through selected radii. These common system members are chosen with respect to the vectorial force resolution patterns which they will produce when they combine to join forces with the viscosity and compliance characteristics of the film loop bights $a$ to $h$ inclusive. These bights occur in the semi-slack film loops interposed between the rollers and their provincially associated sprockets. The bights in the upper and lower film loops interposed toward the sound drum, serve to semi-isolate the sound drum during periods of minor film disturbances occurring between the rollers and their associated sprockets.

One of the advantages of my method and means of stabilizing results in permitting employment of an inertia wheel of relatively light weight, in addition to the many advantages hereinbefore set forth.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to protect by Letters Patent is:

1. A sound film translating system comprising a rotatable sound drum of substantial inertia on which a perforated film, of substantial bending elasticity and viscosity and carrying a sound track, may be moved with the track in operating relation to a sound translating device, synchronized sprocket means for feeding film to and taking film from said drum at substantially identical rates, the minimum distance along the path of a film around said sound drum to the teeth of said sprocket means at each side of said sound drum being intermediate to the distance between an integral number of perforations of said film, to require that said film be slacked off to register with said teeth, roller means of substantial translational inertia resting resiliently, with only the force due to its weight on said film between said drum and said sprocket means on each side of said drum, said force serving only to partially tighten said film and to produce substantial bowed bights from the remaining slack on each side of said sound drum, an impedance roller to force said film into contact with said drum, whereby under steady running conditions vibrations transmitted to said film by said sprocket means are dissipated in the viscosity of said film at said bights, and substantially equal loops are maintained by said roller means in said feed and take-off portions of said film, and under starting conditions oscillations due to inertia and elasticity are also dissipated in said viscosity.

2. A sound film translating system comprising a rotatable sound drum of substantial inertia on which a perforated film, of substantial bending elasticity and viscosity and carrying a sound track, may be moved with the track in operating relation to a sound translating device, synchronized sprocket means for feeding film to and taking film from said drum at substantially identical rates, the minimum distance along the path of a film around said sound drum to the teeth of said sprocket means at each side of said sound drum being intermediate to the distance between an integral number of perforations of said film, to require that said film be slacked off to register with said teeth, roller means of substantial translational inertia resulting resiliently, with a force of the order of its weight, on said film between said drum and said sprocket means on each side of said drum, said force serving only to partially tighten said film to produce substantial bowed bights from the remaining slack on each side of said sound drum, an impedance roller to force said film into contact with said drum, whereby under steady running conditions vibrations transmitted to said film by said sprocket means are dissipated in the viscosity of said film at said bights, and substantially equal loops are maintained by said roller means in said feed and take-off portions of said film, and under starting conditions oscillations due to inertia and elasticity are also dissipated in said viscosity.

References Cited in the file of this patent

UNITED STATES PATENTS

| | | |
|---|---|---|
| Re. 19,270 | Kellogg | Aug. 14, 1934 |
| 1,831,562 | Heisler | Nov. 10, 1931 |
| 2,013,109 | Reynolds | Sept. 3, 1935 |
| 2,108,337 | Hoffman | Feb. 15, 1938 |
| 2,251,322 | Buhrendorf | Aug. 5, 1941 |
| 2,416,606 | Zimmerman | Feb. 25, 1947 |
| 2,442,400 | Collins | June 1, 1948 |
| 2,499,210 | Bartelson | Feb. 28, 1950 |

FOREIGN PATENTS

| | | |
|---|---|---|
| 370,001 | Great Britain | Mar. 24, 1932 |
| 477,943 | Great Britain | Jan. 10, 1938 |
| 582,180 | Germany | Aug. 10, 1933 |
| 753,206 | France | Aug. 7, 1933 |